Sept. 27, 1960 L. E. TIEMAN 2,953,853
CHEESE CUBING APPARATUS
Filed Dec. 16, 1957 2 Sheets-Sheet 1

INVENTOR.
Lloyd E. Tieman
BY
ATTORNEY

Sept. 27, 1960    L. E. TIEMAN    2,953,853
CHEESE CUBING APPARATUS
Filed Dec. 16, 1957    2 Sheets-Sheet 2
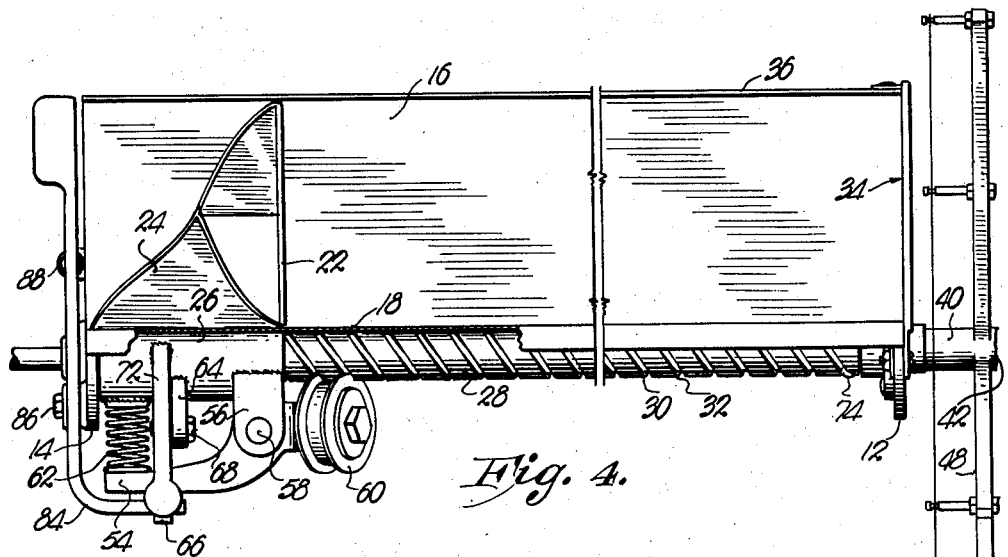
Fig. 4.
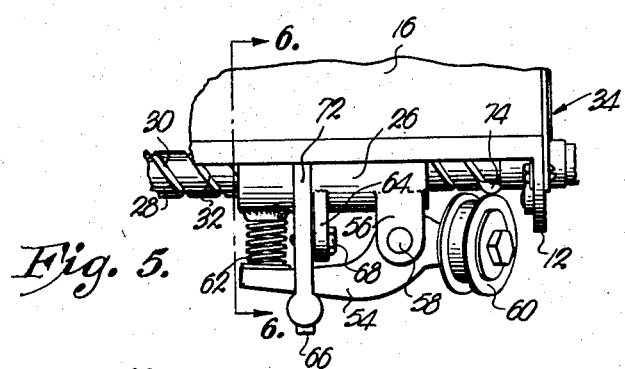
Fig. 5.
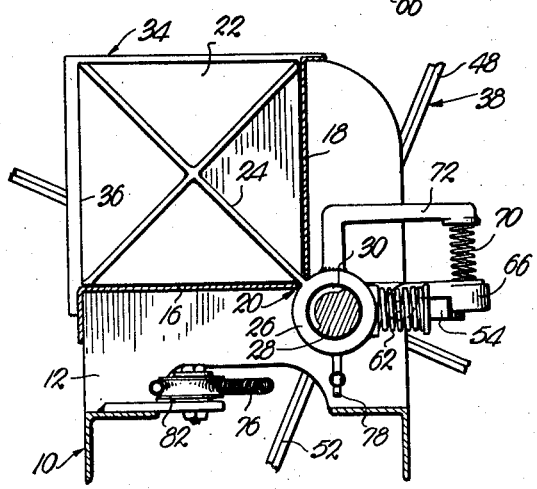
Fig. 6.
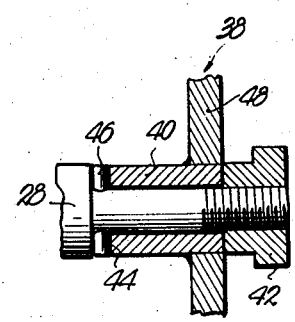
Fig. 7.
INVENTOR.
Lloyd E. Tieman
BY
ATTORNEY.

United States Patent Office 2,953,853
Patented Sept. 27, 1960

2,953,853

CHEESE CUBING APPARATUS

Lloyd E. Tieman, Topeka, Kans., assignor, by mesne assignments, to Ohse Meat Products of Oklahoma, Inc., Okmulgee, Okla., a corporation of Oklahoma Filed Dec. 16, 1957, Ser. No. 703,144

4 Claims. (Cl. 31—6)

This invention relates to the slicing of food and has for its primary object the provision of novel mechanism for actuating a pressure plate from a screw that is adapted to rotate continuously in one direction, the mechanism being provided with automatically releasable parts permitting quick retraction of the pressure plate to the beginning of its path of travel.

The most important object of the present invention is to provide nut means engageable with the screw and mounted for swinging movement out of meshing relationship with the screw threads thereof, whereby the pressure plate may be returned to one end of its path of travel through use of spring means or the like where the nut is again released for operable engagement with the screw threads.

Another important object of the present invention is to provide novel means for releasing the nut which includes a ramp projection at one end of the threads which lifts the nut out of engagement therewith automatically and without operator attention.

Additional objects include the way in which releasable means is provided to hold the nut disengaged from the screw threads as the pressure plate is returned to one end of the screw; the manner of providing a spring-loaded latch to hold the nut in such disengaged position; the way in which means is provided to release the latch after the device is loaded with food to be sliced or cubed; and other important details of construction to be made clear as the following specification progesses.

In the drawings:

Fig. 4 is a plan view, parts being broken away for clearness.

Fig. 5 is a fragmentary, plan view similar to Fig. 4 showing certain parts at the opposite end of the path of travel thereof.

Fig. 6 is a transverse, cross-sectional view taken on line 6—6 of Fig. 5; and

Fig. 7 is an enlarged, fragmentary, detailed, cross-sectional view taken on line 7—7 of Fig. 3.

Figure 1:
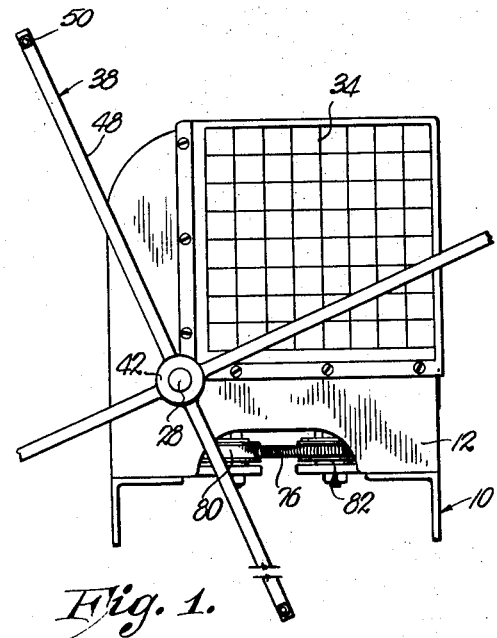
Fig. 1 is a front end view of a cheese cubing apparatus made pursuant to my present invention.

A suitable base 10 for supporting the component parts of the apparatus illustrated in the drawings, is provided with L-shaped end plates 12 and 14 extending upwardly therefrom to which is attached an elongated, L-shaped food support having a bottom 16 and a side wall 18 which extends longitudinally throughout the length of the apparatus, it being noted that there is provided a longitudinal slot 20 at the corner between bottom 16 and wall 18 throughout the lengths thereof.

Figure 3:
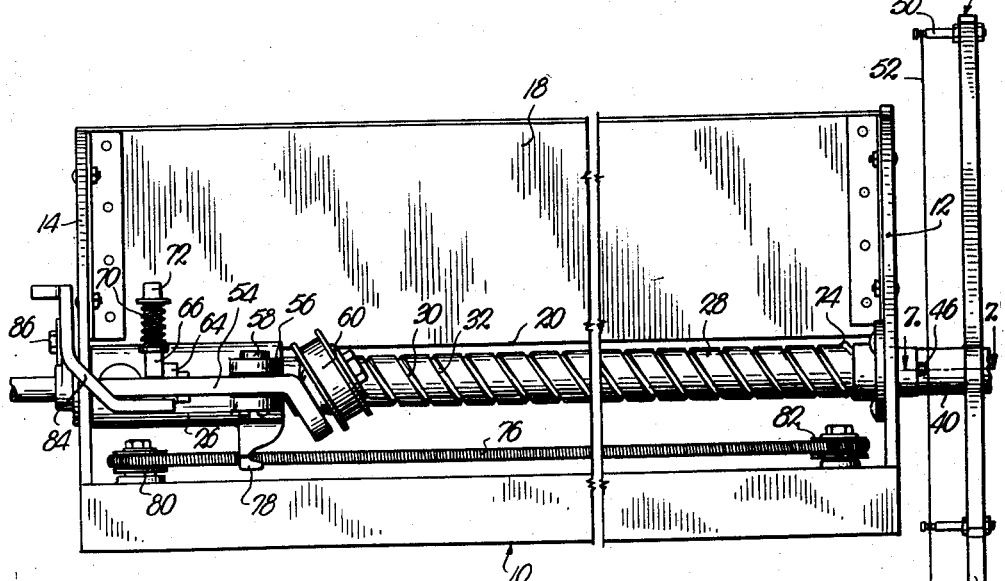
Fig. 3 is a side elevational view thereof.

A pressure plate 22 on bottom 16 and slidable along the wall 18, has an inclined web 24 which extends through the slot 20, as best seen in Fig. 6, and is welded or otherwise joined rigidly to a collar 26 freely slidable along an elongated element 28. The element 28 is rotatably carried by the end plates 12 and 14 in parallelism with the path of travel of the pressure plate 22 as best seen in Fig. 3, and is provided with screw threads 30 and 32 between plates 12 and 14.

A wire grid 34 is carried by walls 16, 18 and 36 at one end of the latter, and a wheel 38 is releasably mounted on that end of the element 28 proximal to the grid 34. Wheel 38 has a hub 40 held in place on the element 28 by a nut 42 and connected thereto for rotation therewith by opposed notches 44 receiving oppositely-extending pins 46 on the element 28 (see Fig. 7).

A plurality of spokes 48 rigid to the hub 40 are in turn provided with pins 50 at the ends thereof which are interconnected by cutting wires 52 between the grid 34 and the spokes 48.

Collar 26 carries a horizontally swingable arm 54 through the medium of outwardly extending ears 56 and a vertical pivot pin 58. A double flanged nut 60 adapted to mesh with the threads 30 and 32 is rotatably mounted on the arm 54. Spring 62 between collar 26 and arm 54 yieldably holds the nut 60 in mesh with the threads 30 and 32 as shown in Fig. 4.

A laterally extending lug 64 on the collar 26 supports a vertically swingable latch 66 through the medium of a pivot pin 68, and a spring 70 yieldably holds the latch 66 biased downwardly toward an operable position engaging the arm 54. Spring 70 is interposed between the latch 66 and an L-shaped arm 72 secured to the collar 26 and extending into overlying relationship to the latch 66.

The element 28 is provided with ramp means for each of the threads 30 and 32 at that end of the latter proximal to plate 12, terminating in projections 74 and formed to cause the nut 60 to move out of engagement with the threads 30 and 32 in the manner illustrated by Fig. 5 of the drawings.

When the nut 60 is in such inoperative position, a spring 76 returns the pressure plate 22 to the beginning of its path of travel as illustrated in Fig. 4. A hook 78 depending from the collar 26, receives one end of the spring 76, when the coil spring 76 passes around a pulley 80, then around a second pulley 82 and terminating in a suitable point of connection (not shown) at the opposite end of the spring 76 with the base 10, pulleys 80 and 82 both being carried by base 10.

A manual release for the latch 66 takes the form of a lever 84 swingable about a pivot pin 86 on end plate 14. A spring 88 between plate 14 and lever 84 yieldably biases the latter upwardly, as seen in Fig. 2.

Figure 2:
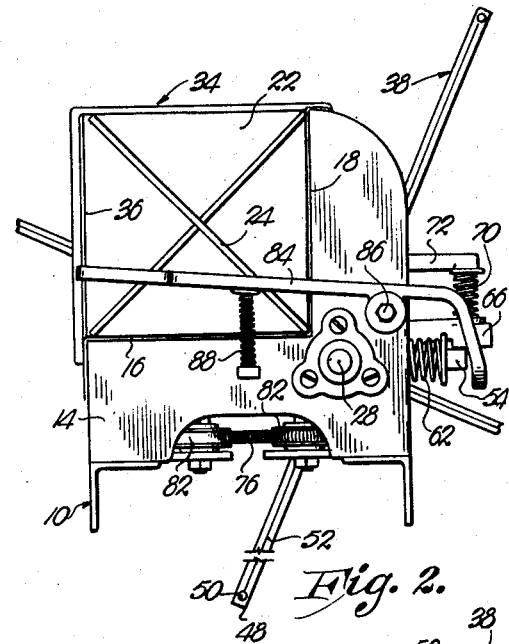
Fig. 2 is a rear elevational view thereof.

Lever 84 terminates at one end thereof in underlying relationship to the latch 66 as clearly illustrated in Figs. 2–4.

The element 28 may be rotated by hand or caused to rotate continuously in one direction by an operable connection with a suitable prime mover (not shown) connected with that end of the element 28 proximal to plate 14.

Assuming plate 22 to be at that end of its path of travel shown in Fig. 4, and the nut 60 to be released from threads 30 and 32 as shown in Figs. 5 and 6, continuous rotation of the element 28 has no effect upon plate 22 and, therefore, food to be sliced may be placed upon the bottom 16 in front of plate 22 between the latter and the grid 34, such food taking the form, for example, of an elongated block of cheese.

The operator thereupon releases the nut 60 by pressing downwardly on lever 84 against spring 88. As lever 84 swings about pivot 86, it moves into engagement with the latch 66, thereby raising the latter about pivot pin 68 against the action of spring 70. This releases the arm 54 and swings the same about pivot 58 to move the nut 60 into meshing relationship with the threads 30 and 32 as seen in Fig. 4. As the element 28, acting on the nut 60, draws the collar 26 therealong toward the plate 12, the food will be forced through the grid 34 and into the path of travel of the cutting wires 52. It is understood that during continuous rotation of the element 28 to advance the plate 22, wheel 38 is likewise constantly rotated to slice the food into relatively small cubes.

As the nut 60 approaches that end of its path of travel adjacent plate 12, the spaced, external flanges thereof are progressively retracted from the threads 30 and 32 because of the ramp means which terminate in the projections 74. Thus, as seen in Fig. 5, arm 54 is swung against the action of spring 62, whereupon the latch 66 immediately snaps into position engaging the arm 54 by the action of spring 70, holding the nut 60 out of engagement with the threads 30 and 32. At this time, spring 76 acts immediately to withdraw the plate 22 by shifting the collar 26 and all of its component parts along the element 28 toward the plate 14. Although the element 28 and the wheel 38 continue to rotate, plate 22 remains motionless while the operator places another block of cheese on the bottom 16, whereupon the lever 84 is again actuated to release latch 66.

Having thus described the invention what is claimed as new and desired to be secured by Letters Patent is:

1. In a food slicer, an elongated element provided with external screw threads and mounted for continuous rotation in one direction; a pressure member mounted for reciprocation along a path of travel parallel with said element and having a collar rigid thereto and freely slidable along the element; a nut support swingable on the collar; a nut rotatably mounted on said support; a spring between the collar and the support for yieldably holding the nut in engagement with the threads whereby the rotating element moves the member to one end of said path of travel; means on the element for releasing the nut from its engagement with the threads when the member reaches said one end of its path of travel; a spring-loaded latch on the collar engageable with said support for holding the nut disengaged from the threads as the member is returned to the opposite end of its path of travel and manually manipulable means operably coupled with said latch for moving the latter in a direction to release the nut to permit the same to reengage the threads of said element.

2. The invention of claim 1, wherein said nut support includes an arm pivotally secured to said collar and swingable relative thereto about a vertical axis at a point intermediate the ends of said arm, said spring being disposed between said collar and one end of said arm, said nut being pivotally mounted on the opposite end of said arm and rotatable relative thereto about a vertically inclined axis, said nut being provided with flange means on the periphery thereof engageable with the threads of said element, said latch including a downwardly biased bar pivotal about a horizontal axis and having a recess adapted to receive said arm when said nut has been moved out of engagement with said element and thereby to maintain said nut out of intermeshing relationship with said element until after release of said nut.

3. The invention of claim 2, wherein said bar is disposed between said spring and said vertical axis of rotation of said arm.

4. The invention of claim 2, wherein said manually manipulable means includes a generally horizontal lever pivotally mounted for rotation about a horizontal axis proximal to said opposite end of the path of travel of the pressure member, said lever being provided with an elongated handle portion and an L-shaped section on opposite sides of the axis of pivoting thereof, said L-shaped section having an extension disposed below said bar with said recess being provided therein adjacent the outer extremity of the same, there being means engaging said lever for swinging the latter in a direction to move said extension thereof toward the arm whereby upon movement of the nut away from the element and engagement of the arm with said bar within said recess in the latter, the arm is restrained against return swinging thereof until sufficient manual pressure has been applied to said handle to swing the latter in the opposite direction to a position with said recess clearing the arm.

References Cited in the file of this patent

UNITED STATES PATENTS

| 1,286,796 | Schaffer | Dec. 3, 1918 |
| 1,758,257 | Kaskouras | May 13, 1930 |
| 2,814,998 | Maddux | Dec. 3, 1957 |